(12) United States Patent
DeLuca et al.

(10) Patent No.: US 11,227,321 B2
(45) Date of Patent: Jan. 18, 2022

(54) TRANSPOSABLE BEHAVIOR DATA

(71) Applicant: International Business Machines Corporation, Armonk, NY (US)

(72) Inventors: Lisa Seacat DeLuca, Baltimore, MD (US); David M. Ogle, Powell, OH (US); Trevor Grant, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 16/010,913

(22) Filed: Jun. 18, 2018

(65) Prior Publication Data
US 2019/0385211 A1 Dec. 19, 2019

(51) Int. Cl.
*G06Q 30/00* (2012.01)
*G06Q 30/06* (2012.01)
*G06N 5/04* (2006.01)

(52) U.S. Cl.
CPC ........... *G06Q 30/0631* (2013.01); *G06N 5/04* (2013.01)

(58) Field of Classification Search
CPC .............................. G06Q 30/0631; G06N 5/04
USPC ....................................................... 705/26.7
See application file for complete search history.

(56) References Cited

U.S. PATENT DOCUMENTS

| | | |
|---|---|---|
| 6,313,745 B1 | 11/2001 | Suzuki |
| 7,692,536 B2 | 4/2010 | Channell |
| 2002/0045959 A1 | 4/2002 | Van Overveld |
| 2007/0038765 A1* | 2/2007 | Dunn ................... G06F 21/6218 709/229 |
| 2011/0282954 A1* | 11/2011 | Flake .................... H04L 63/102 709/206 |
| 2013/0218721 A1 | 8/2013 | Borhan et al. |
| 2013/0254006 A1 | 9/2013 | Braun et al. |
| 2014/0280113 A1 | 9/2014 | Hohwald |
| 2015/0112826 A1* | 4/2015 | Crutchfield, Jr. .. G06Q 30/0601 705/26.1 |
| 2015/0145671 A1 | 5/2015 | Cohen et al. |

(Continued)

FOREIGN PATENT DOCUMENTS

CN 201984528 U 9/2011

OTHER PUBLICATIONS

Zin, Thi Thi, et al. "A big data application framework for consumer behavior analysis." 2013 IEEE 2nd Global Conference on Consumer Electronics (GCCE). IEEE, 2013. (Year: 2013).*

(Continued)

*Primary Examiner* — Matthew E Zimmerman
(74) *Attorney, Agent, or Firm* — Nicholas A. Welling; Edward J. Wixted, III

(57) ABSTRACT

Aspects of the present invention disclose a method, computer program product, and system for capturing and transposing user behavioral data. The method includes determining that a user enters a first venue based on tracking a computing device of the user. The method further includes capturing behavioral data of the user in the first venue as the user interacts with a first product, where the captured behavioral data is saved to a database. The method further includes responsive to determining that the user enters a second venue, determining a set of recommendations for the user that has entered the second venue, based on the behavioral data in the user profile and a product available to the user in the second venue. The method further includes generating a recommendation to a user.

17 Claims, 4 Drawing Sheets

(56) References Cited

U.S. PATENT DOCUMENTS

| | | |
|---|---|---|
| 2015/0170252 A1 | 6/2015 | Koo Tze Mew |
| 2015/0356626 A1 | 12/2015 | Chawla |
| 2016/0117763 A1* | 4/2016 | Cypher ................. G06F 3/0482 235/375 |
| 2017/0091850 A1 | 3/2017 | Alvarez |
| 2017/0169470 A1 | 6/2017 | Deluca |
| 2018/0011941 A1 | 1/2018 | Cypher et al. |
| 2018/0060503 A1 | 3/2018 | Allen |
| 2018/0300788 A1 | 10/2018 | Mattingly |
| 2019/0385212 A1 | 12/2019 | Deluca |

OTHER PUBLICATIONS

DeLuca et al., "Real-Time In-Venue Cognitive Recommendations To User Based On User Behavior", U.S. Appl. No. 16/010,952, filed Jun. 18, 2018, 49 pages.

IBM, "List of Patent Applications Treated As Related", Appendix P, Filed Herewith, 2 pages.

\* cited by examiner

TRANSPOSABLE BEHAVIOR DATA

BACKGROUND

The present invention relates generally to the field of e-commerce, and more particularly to behavioral analytics.

Behavioral analytics is a recent advancement in business analytics that reveals new insights into the behavior of consumers on eCommerce platforms, online games, web and mobile applications, and Internet of Things (IoT). The rapid increase in the volume of raw event data generated by the digital world enables methods that go beyond typical analysis by demographics and other traditional metrics that tell us what kind of people took what actions in the past. Behavioral analysis focuses on understanding how consumers act and why, enabling accurate predictions about how they are likely to act in the future. It enables marketers to make the right offers to the right consumer segments at the right time.

Behavioral analytics utilizes the massive volumes of raw user event data captured during sessions in which consumers use application, game, or website, including traffic data like navigation path, clicks, social media interactions, purchasing decisions and marketing responsiveness. Also, the event-data can include advertising metrics like click-to-conversion time, as well as comparisons between other metrics like the monetary value of an order and the amount of time spent on the site. These data points are then compiled and analyzed, whether by looking at session progression from when a user first entered the platform until a sale was made, or what other products a user bought or looked at before this purchase. Behavioral analysis allows future actions and trends to be predicted based on the collection of such data.

While business analytics has a broader focus on the who, what, where and when of business intelligence, behavioral analytics narrows that scope, allowing one to take seemingly unrelated data points in order to extrapolate, predict and determine errors and future trends. It takes a more holistic and human view of data, connecting individual data points to tell us not only what is happening, but also how and why it is happening.

SUMMARY

According to one embodiment of the present invention, a method for capturing and transposing user behavioral data is provided. The method includes determining that a user enters a first venue based on tracking a computing device of the user. The method further includes capturing behavioral data of the user in the first venue as the user interacts with a first product, where the captured behavioral data is saved to a database. The method further includes responsive to determining that the user enters a second venue, determining a set of recommendations for the user that has entered the second venue, based on the behavioral data in the user profile and a product available to the user in the second venue. The method further includes generating a recommendation to a user.

DETAILED DESCRIPTION

Figure 1:
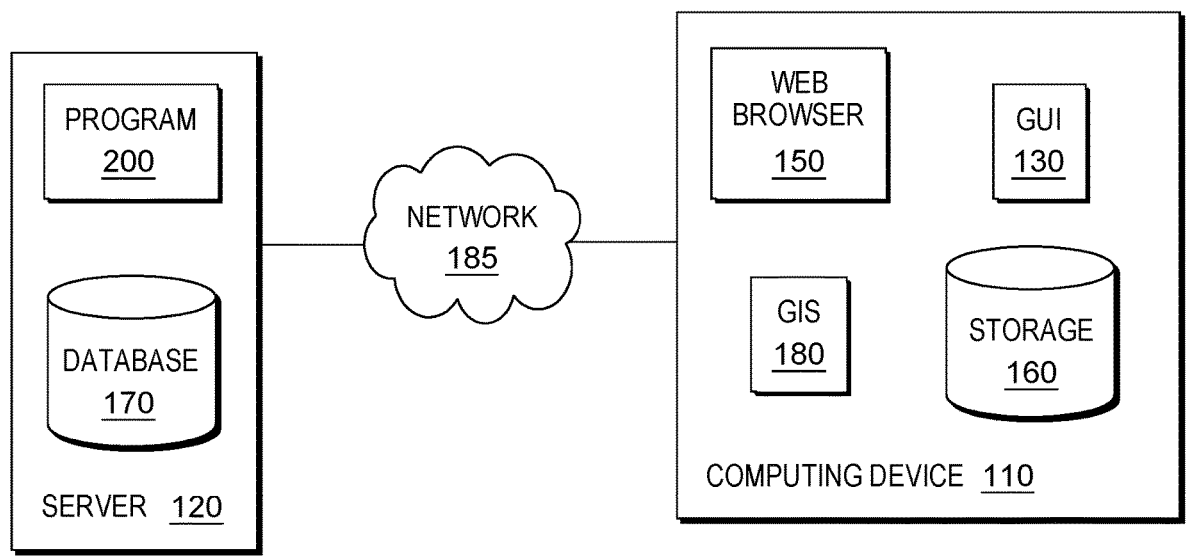
FIG. 1 is a functional block diagram illustrating a distributed data processing environment, in accordance with an embodiment of the present invention.

Embodiments of the present invention recognize that computing devices collect user behavioral data out in the world and send the user behavioral data back to a third party's cloud service for storage and processing. The user will be agreeing to provide this behavioral data. The user behavioral data has value, not only to the company that generates the data, but to other third parties that provide data processing services. User behavioral data involves a chain of events beginning with aggregating the behavioral data from many sources, analyzing the user behavioral data, and using the behavioral data to drive recommendations.

Embodiments of the present invention recognize that the ownership of user behavioral data is problematic because it is a third party that captures and processes user behavioral data, thus giving the third party an ownership over the user behavioral data. Embodiments of the present invention recognize that current approaches to user behavioral data do not provide a means or method for a user to capture, transpose, and retain ownership over their personal behavioral data.

Embodiments of the present invention provide a method that enables a user to capture, transpose, use, store, and ultimately own their personal behavioral data in real time. The present invention utilizes radio frequency identification devices (RFID) in combination with cognitive computing to track real time user behavioral data to drive recommendations based upon the user captured user behavioral data. Embodiments of the present invention utilize the real time user behaviors, behavioral data, of the user to learn the preferences of the user over time to generate novel cross co-occurrence models and matrices to drive the recommendations to the user. Current approaches to utilizing user behavioral data do not include a method to learn the preferences of the user from behavioral data owned and retained by the user. Embodiments of the present invention recognize the inherent differences in the capability of a human and that of a computing device. Embodiments of the present invention recognize that machine learning is inherently different from human learning. Embodiments of the present invention leverage a specialized set of rules that govern such machine learning and are leveraged to generate customized notifications that are presented to the user. Embodiments of the present invention recognize that computer learning of the preferences of a user, based on behavioral data that is owned and retained by the user, encompasses a previously unknown computer functionality in at least the field of e-commerce. Embodiments of the present invention provide an improvement to the functioning of computing devices by leveraging the learned preferences of the user to generate and then present customized notifications to the user. Further, embodiments of the present invention recognize that a general function of most computing devices requires the conveyance of pertinent information to a user in a manner that is intelligible to the user. Embodiments of the present invention recognize that visual representations, such as notifications displayed to a user, may be leveraged to convey multiple types of information to a user in a manner that is predicted to enable the user to comprehend the multiple types of information. Embodiments of the present invention recognize that an improvement in visual conveyance of pertinent information to a user by a computing system encompasses an improvement to the computing system itself. Embodiments of the present invention provide such an improvement in at least the form of customized notifications that are presented to the user.

Example embodiments, in accordance with the present invention, will now be described in detail with reference to the Figures. FIG. 1 is a functional block diagram, illustrating distributed data processing environment 100. Distributed data processing environment 100 includes computing device 110 and server 120 interconnected over network 185.

Computing device 110 may be a desktop computer, a laptop computer, a tablet computer, a specialized computer server, a smartphone, a wearable device (e.g., smart watch, personal fitness device, personal safety device), or any programmable computer system known in the art with an interactive display or any other computer system known in the art. In certain embodiments, computing device 110 represents a computer system utilizing clustered computers and components that act as a single pool of seamless resources when accessed through network 185, as in data centers and with cloud computing applications. In general, computing device 110 is representative of any programmable electronic device or combination of programmable electronic devices capable of executing machine-readable program instructions and communicating with other computer devices via a network.

In one embodiment, computing device 110 includes graphical user interface (GUI) 130, web browser 150, storage 160, geographic information system (GIS) 180. The various programs on computing device 110 may optionally include web browser 150, an electronic mail client, security software (e.g., a firewall program, a geo-locating program, an encryption program, etc.), an instant messaging (IM) application (app), and a communication (e.g., phone) application.

In one embodiment, graphical user interface 130 operates on computing device 110. In another embodiment, graphical user interface 130 operates on another computer in a server based setting, for example on a server computer (e.g., server 120). In yet another embodiment, graphical user interface 130 operates on computing device 110 simultaneously with a server computer interconnected through server 120. Graphical user interface 130 may be any user interface used to access information from computing device 110, such as information gathered or produced by program 200. Additionally, graphical user interface 130 may be any user interface used to supply information to computing device 110, such as information supplied by a user to be used by program 200. In some embodiments, graphical user interface 130 may present web browser 150, used to retrieve, present, and negotiate resources from the Internet. In other embodiments, graphical user interface 130 may be a software or application that enables a user at computing device 110 access to network 185.

In yet another embodiment, a user of computing device 110 can interact with graphical user interface 130 through a touch screen that performs as both an input device to a graphical user interface (GUI) and as an output device (i.e., an electronic display) presenting a plurality of icons associated with software applications or images depicting the executing software application. Optionally, a software application (e.g., web browser 150) can generate graphical user interface 130 operating within the GUI of computing device 110. Graphical user interface 130 accepts input from a plurality of input/output (I/O) devices including, but not limited to, a tactile sensor interface (e.g., a touch screen or a touchpad) referred to as a multi-touch display. An I/O device interfacing with graphical user interface 130 may be connected to computing device 110, which may operate utilizing wired (e.g., Universal Serial Bus (USB) port) or wireless network communications (e.g., infrared, near-field communication (NFC), etc.). Computing device 110 may include components, as depicted and described in further detail with respect to FIG. 4, in accordance with embodiments of the present invention.

Web browser 150 may be a generic web browser used to retrieve, present, and traverse information resources from the Internet. In some embodiments, web browser 150 may be a web browser designed for a mobile device. In other embodiments, web browser 150 may be a web browser designed for a traditional computing device, such as a desktop computer, PC, or laptop. In general, web browser 150 may be any application or software that enables a user of computing device 110 to access a webpage over network 185. In the depicted environment, web browser 150 resides on computing device 110. In other embodiments, web browser 150, or similar web browsers, may reside on other computing devices capable of accessing a webpage over network 185.

Storage 160, a database, located on computing device 110, represents any type of storage device capable of storing data that is accessed and utilized by computing device 110. In other embodiments, storage 160 represents multiple storage devices within computing device 110. Storage 160 stores information such as, but not limited to, account information, credentials for authentication, user preferences, lists of preferred users, previously visited websites, history of visited Wi-Fi portals, and the history of the location of the computing device.

Geographic information system (GIS) 180 is a system designed to capture, store, manipulate, analyze, manage, and present all types of geographic data. In general, GIS describes any information system that integrates, stores, edits, analyzes, shares, and displays geographic information. In some embodiments, GIS 180, on computing device 110, contains Global Positioning System (GPS) receivers. In other embodiments, GIS 180 contains radio-frequency identification (RFID) tags. In still other embodiments, GIS 180 contains other sensors and/or receivers used by program 200 to determine the location of computing device 110. GIS 180 may utilize GPS or triangulation techniques to determine the physical location of computing device 110.

In another example, GIS 180 may utilize a series of RFID tag readers to locate a computing device with an RFID tag. GIS 180 contains a globally unique identifier (GUID) that is assigned for each computing device. The GUID can be the media access control (MAC) address for the device. The device is tracked through the GUID located on GIS 180.

GIS 180 operates to enhance program 200 to increase the accuracy or amount of location-related information that program 200 obtains. GIS 180 utilizes GUID information, combined with a sampling of data collected by GIS 180, to make determinations regarding the location of computing device 110. In an example embodiment, GIS 180 may receive a series of data points collected by the GUID. GIS 180 may use the received data points to create a path, and compare that path to GUID information corresponding to the location of the received data points.

Server 120 may be a desktop computer, a laptop computer, a tablet computer, a specialized computer server, a smartphone, or any other computer system known in the art. In certain embodiments, server 120 represents a computer system utilizing clustered computers and components that act as a single pool of seamless resources when accessed through network 185, as is common in data centers and with cloud computing applications. In general, server 120 is representative of any programmable electronic device or combination of programmable electronic devices capable of executing machine-readable program instructions and communicating with other computer devices via a network. In one embodiment, server 120 includes program 200 and database 170.

Database 170 may be a repository that may be read by geographic information system (GIS) 180. GIS data and information, such as maps, floor plans, geographic information, location names, and other information may be stored to database 170. In some embodiments, GIS 180 may access and retrieve information from database 170. In other embodiments, a program on server 120 (not shown) may prompt and update database 170 with information. The data stored to database 170 may be changed or updated by data input by a user, such as a user with access to server 120. In one embodiment, database 170 resides on server 120. In other embodiments, database 170 may reside on another server, another computing device, or mobile device, provided that database 170 is accessible to GIS 180.

In general, network 185 can be any combination of connections and protocols that will support communications among computing device 110. Network 185 can include, for example, a local area network (LAN), a wide area network (WAN), such as the Internet, a cellular network, or any combination of the preceding, and can further include wired, wireless, and/or fiber optic connections.

In one embodiment, program 200 operates on server 120. Program 200 provides the capability for a user to save and transpose their behavioral data between venues. Embodiments of Program 200 are capable of utilizing Wi-Fi technology, Bluetooth, NFC tags, Global System for Mobile Communications (GSM), and GPS Technology to communicate with the computing device of a user (e.g., computing device 110).

In one embodiment, program 200 tracks the movement of a computing device within a space or region, defined by beacons within a department store that are capable of reading RFID tags. A beacon is broadcasting equipment at a particular location. The beacon sends information to the computing device of a receptive user walking around the store, which can be text, images, audio or video to enabled computing devices within the range of the beacon.

In an example embodiment, program 200 operates as a code snippet within one or more applications on computing device 110. Code snippets define the scope of interactivity between the snippets and the application, (e.g., program 200 hosted on server 120 interacting with a web browser application on computing device 110). For example, program 200 is a function within web browser 150, and the processes of program 200 occur automatically (i.e., without user intervention) during operation of web browser 150 as initiated by program 200. The dynamic code snippet elements provide scripting support. The variables enable dialog between program 200, through server 120, graphical user interface 130, and web browser 150.

In one embodiment, program 200 has the ability to access web browser 150, through utilizing GIS 180 of computing device 110 to enable a user to save and transpose behavioral data between venues to drive recommendations. In this embodiment, program 200 can determine and track the behavior of a user within defined zones in different venues. Program 200 saves and transposes behavioral data of the user between multiple venues to drive real time recommendations for the user. In another embodiment, program 200 has the ability to automatically populate the web browser of a user with real-time information directed to behavioral data of a user from one or more venues that the user visited.

Figure 2:
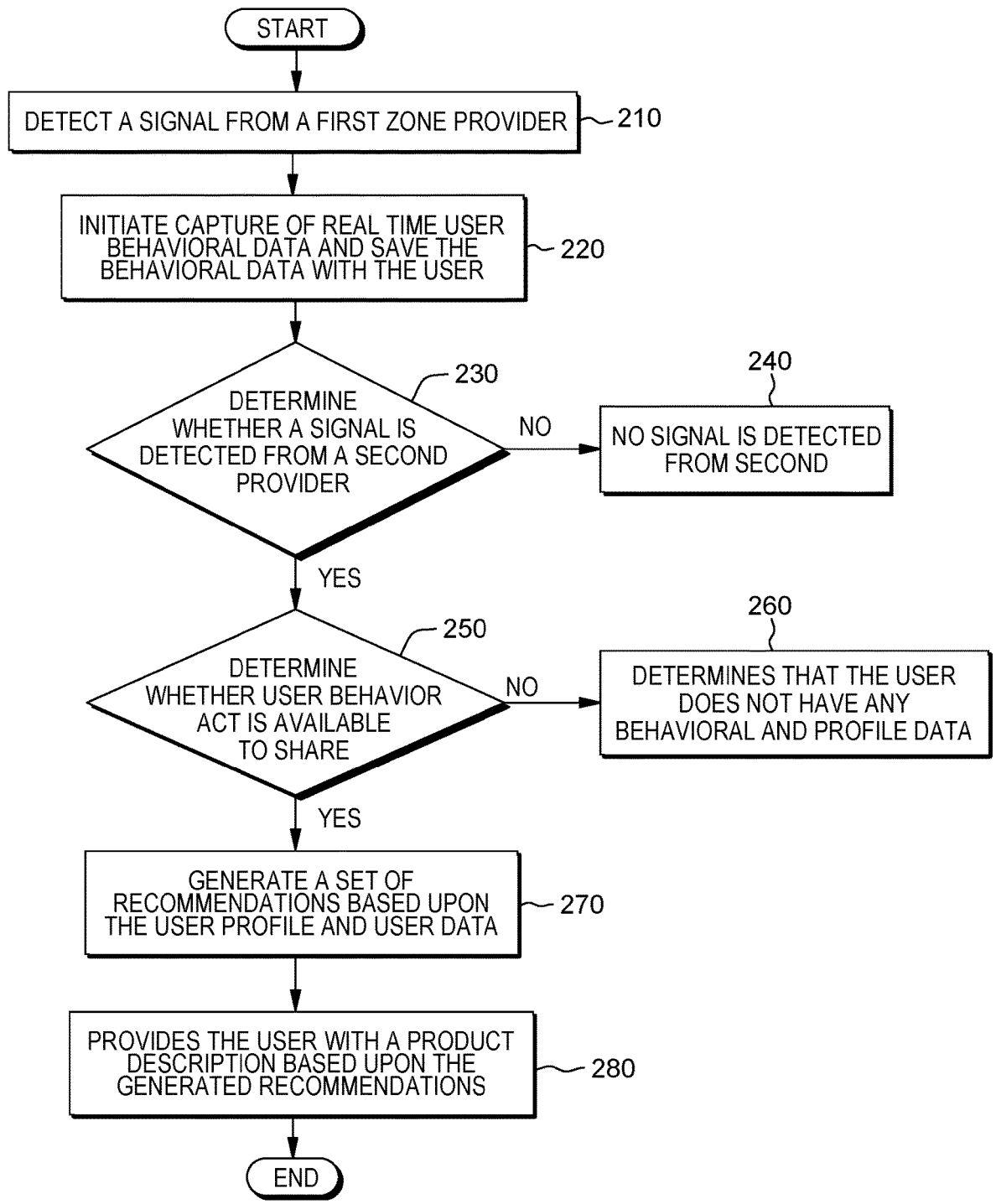
FIG. 2 is a flowchart depicting operational steps of a program for a user to save and transpose behavioral data between different venues to drive recommendations, in accordance with the present invention.

FIG. 2 is a flowchart depicting the operational steps of program 200, a program that enables a user to save and transpose behavioral data between different venues to drive recommendations, in accordance with an embodiment of the present invention. Embodiments of the present invention recognize that the operational steps encompass a specialized set of rules that govern machine learning and the generation of customized notifications that are presented to a user.

In step 210, program 200 detects a signal from a first zone provider. A zone provider is a source, or owner, of independent Wi-Fi network access points, such as proximity sensors, beacons, or networks of access points that are distributed in a defined space. In an embodiment, a zone provider uses RFID, NFC, a connection to a wireless access point, etc., to determine that a user A is walking around the store. The zone provider enables captive portals that dictate the usage of access credentials and consent for all users before enabling access to the network of the zone provider. In one embodiment, program 200 establishes a communication link with computing device 110 in response to a shopper entering a shopping environment.

For example, program 200 detects and grants access to the computing device 110 within the boundaries of a specified shopping zone. The zone provider does not require a security check for computing device 110 because the zone provider network establishes a handshake between computing device 110 and the zone provider without a security protocol in order to maximize access to the computing devices of users within the zone. In this example, a zone is determined by a short range wireless system that can support many computing devices. The beacons define each zone and contain information specific to that zone. In another embodiment, program 200 detects and grants access to computing device 110 through detecting certain signals periodically emitted by the re-use of standard access point (AP) technologies with a captive portal. In yet another embodiment, program 200 detects and grants access to computing device 110 through the use of antennas. In this example, a zone provider uses antennas for the detection of signals in the 2.4 or 5 GHz frequency bands and places the antennas within a bounded space in order to maximize the number of computing devices detected. The antennas are positioned in areas to analyze all signals detected within the bands used by Wi-Fi.

In step 220, program 200 initiates capture of real time user behavioral data and saves the behavioral data with the user. In one embodiment, program 200 initiates the capture of user behavioral data through GIS 180 on computing device 110 as the user interacts with one or more products in the zone and saves the user behavioral data on computing device 110. Some examples of the user behavioral data that can be captured include time spent in an area of a zone, a user placing an item in a physical or virtual shopping cart, a user's physical interaction with one or more products, that have sensors, such as physically manipulating an item, picking up an item, trying on an item, or tasting an item. As discussed in step 210, the zone provider seeks to maximize the number of computing devices that have access to the zone provider network. There is no security protocol or other prerequisite to computing device 110 and the zone provider network establishing a handshake to allow access to the zone provider network. The GIS contains sensors and/or receivers that program 200 utilizes to determine user behaviors through computing device 110. In this example, program 200 accesses GIS 180 to utilize GPS or triangulation techniques to initiate, determine, and update, the user behavioral data through computing device 110 within the zone. In this example, program 200 temporarily registers the computing device of a user to constantly provide and receive feedback on the behavioral data of the user in real time. In one embodiment, program 200, via server 120, issues a wireless tag to computing device 110 and receives feedback from GIS 180 of computing device 110.

Program 200 further analyzes the user behavioral data through computing device 110, and multiple computing devices present in the zone, in terms of arrival time, length of visit per zone, paths of movement, and a user's physical interaction with one or more products. Program 200 can detect the user's behavior through the computing devices, such as computing device 110, within the venue based on data received from beacons in the venue. For example, based on the determined, or estimated, distance of the computing device from one beacon to a different strategically placed beacon, program 200 can determine, and continuously update a corresponding location of the computing device and user behavioral data in the venue. In another embodiment, program 200 can receive GPS information from GIS 180 of computing device 110 to determine, and continuously update the user behavioral data within a subzone or zone.

In another embodiment, program 200 initiates the capture of user behavioral data through GIS 180 on computing device 110 as the user interacts with one or more products in the zone and saves the behavioral data on database 170 located on server 120. As discussed above, program 200 captures user behavioral data.

In another embodiment, program 200 initiates capture of user behavior, and saves user behavioral data through determining that a user has logged into program 200 and identified the user with program 200. In some embodiments, program 200 is connected to one or more social media accounts belonging to a user. In an example, program 200 prompts a user to manually enter the name of the user, an email address associated with the social media account of the user and a corresponding password.

Figure 3:
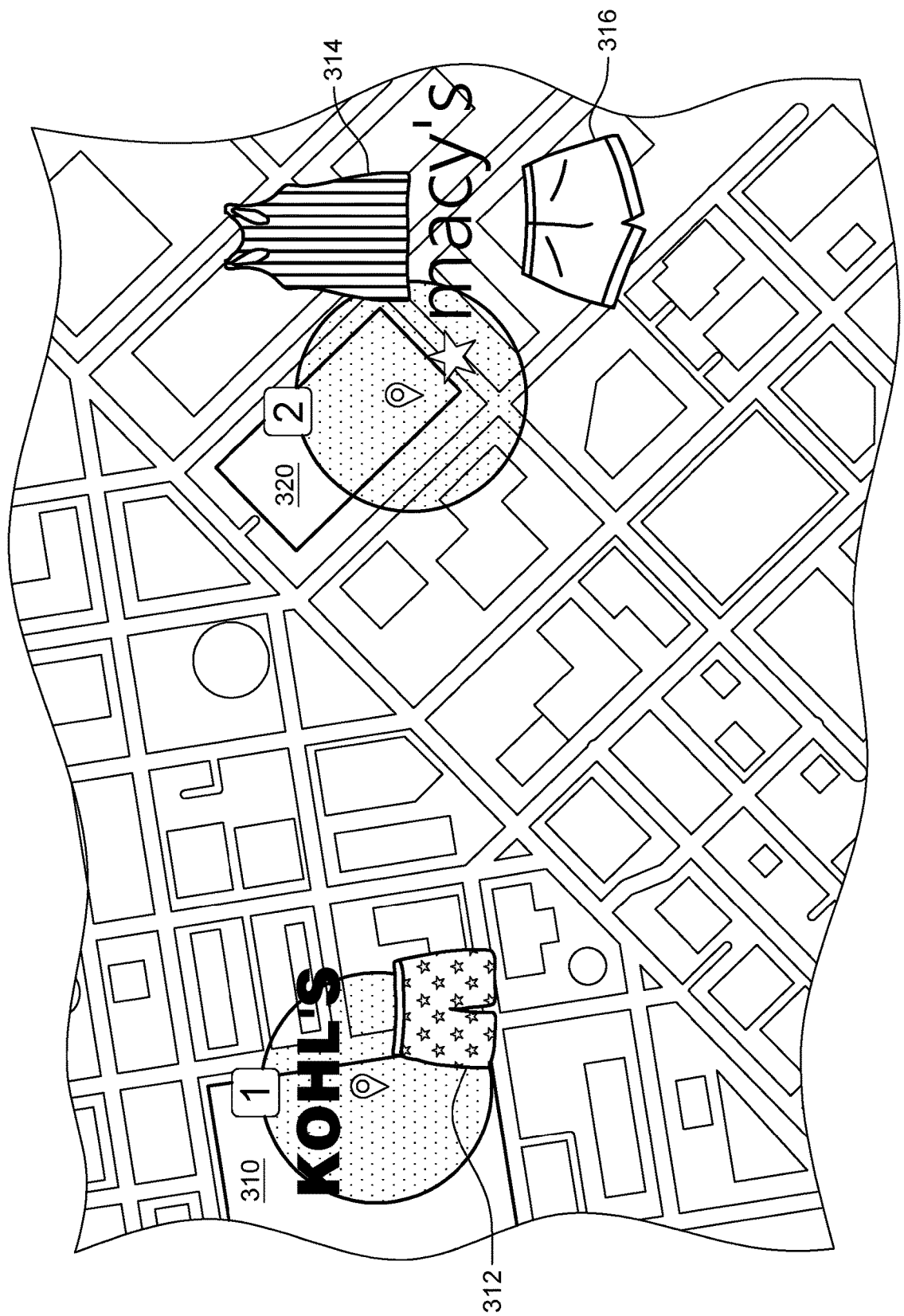
FIG. 3 illustrates an example of the program saving and transposing behavioral data between venues to drive recommendations, in accordance with an embodiment of the present invention.

FIG. 3 illustrates an example of program 200 transposing saved, captured, behavioral data of a user between different venues to drive recommendations, in accordance with an embodiment of the present invention. Embodiments of the present invention recognize that the steps of FIG. 3 encompass a specialized set of rules that govern machine learning and the generation of customized notifications that are presented to a user. In one embodiment, program 200 operates on a server associated with the venue (e.g., server 120) and transposes saved behavioral data 312, 314, and 316 between the first venue 310 and the second venue 320 to drive recommendations to computing device 110. Behavioral data 312, 314, and 316 can include behavioral data related to one or more actions of a user such as: a user touching a product, looking at a product, trying on a product, returning a product, exchanging a product for a different size, exchanging a product for a different color, placing a product in a physical, or virtual, shopping cart, removing the product from the shopping cart, interacting with a second product, and purchasing a product. Additionally, understanding the relationship between products that may be paired together such as a shirt that is tried on with a pair of pants can be used to drive the recommendations to the computing device.

In decision step 230, program 200 determines whether a signal is detected from a second zone provider. In an embodiment, program 200 determines that a user has left a first venue and entered a second separate venue and the separate venue recognizes the presence of the user and asks for any behavioral and profile data. The user has control of what information they are going to provide to the venue In an example, program 200 utilizes GIS 180, on computing device 110, to determine the behavior of the user. Program 200 receives information that the user leaves a first store and enters a second store. Program determines that computing device 110, and the corresponding user, have entered the second store (e.g., the venue) and initiates the request for behavioral and profile data of the user of computing device 110 through accessing GIS 180. The GIS contains other sensors and/or receivers used by program 200 to determine the behavior of the user. In this example, program 200 accesses GIS 180 to utilize GPS or triangulation techniques to determine, and update, the behavior of the user computing device 110 within a zone.

In step 240, program 200 determines that no signal is detected from a second zone provider. In one embodiment, program 200, via server 120, determines that the user has declined to permit access to the computing device of the user. No signal is detected in the second zone. (decision step 230, "no" branch). The second zone provider will not be sending any information to program 200.

In decision step 250, program 200 determines whether the user behavioral data is available to share (decision step 230, "yes" branch). In one embodiment, program 200 determines whether the user has any behavioral and profile data before initiating a request for a user to share the behavioral and profile data of the user. In an example, program 200 performs a cursory analysis of the computing device of the user, without initiating a handshake with the computing device of the user, to determine whether the user has behavioral and profile data. In this example, program 200 may access a history of requests, and answers by the user, to the user to share behavioral and profile data. In another embodiment, program 200 may determine that the user preferences of the user permit the sharing of behavioral and profile data with all retailers without security or without a need to request access. In another embodiment, program 200 may request a user to share data and present the benefits of sharing data to the user. In an example, program 200 may display to the user one or more concise summaries of the user sharing behavioral and profile data such as a retailer offering coupons, or other discounts to the user. In this example, program 200 may present concise summaries of survey research showing the satisfaction of users who utilize program 200.

In step 260 (decision step 250, "no" branch), program 200 determines that the user does not have any behavioral and profile data. In an embodiment, program 200 does not transpose the user data to the second store to drive recommendations. In this example, the behavioral data, that is not available to be shared by the user, may be generated, captured and stored by the venue provider based upon the user's behavior in the second venue. In one embodiment, program 200 determines the user has data but elects not to share the behavioral data.

In an embodiment, program 200 determines that no behavioral and profile data exists and generates a behavioral and profile for the user bases upon a plurality of data on one or more computing devices of the user. Program 200 initiates a request to the user, prompting the use to provide access to program 200 to automatically generate a behavioral profile, and to allow program 200 to track product details about the user. In an example, program 200 determines that the user does not have a behavioral profile, or that behavioral and profile data do not exist for the user. In this example, program 200, after receiving affirmation from the user, analyzes the computing device of the user for the history of data related to any brand or product details of relevance on the computing device of the user. For example, program 200 analyzes email receipts, text messages, package confirmations, data related to applications on the computing device of the user for e-commerce purchases, returns, product viewings, a history of visitations, a history of the frequency of purchases, and the information related to the history of the purchases such as seasonal timing, sizes, color, and the timing of sales related to purchases.

In step 270 (decision step 250, "yes" branch), program 200 generates a set of recommendations based upon the user profile and user data. In an embodiment, program 200, having determined that user behavioral data is available to share, utilizes a plurality of information located and saved on one or more databases to share the data in the second venue to generate a set of recommendations for the user. The generated recommendations will be based on information gathered from the first, and second venue.

In one embodiment, as discussed in step 220, program 200 initiates the capture of user behavioral data through GIS 180 on computing device 110 as the user interacts with one or more products in the second venue, and saves the user behavioral data on computing device 110. The user behavioral data can be sent to a recommendation engine, not depicted, from computing device 110 of the user, through pairing technologies previously discussed.

In another embodiment, as discussed in step 220, program 200, through server 120, initiates a set of authorized get requests to retrieve user behavioral data. In another embodiment, as discussed in step 220, program 200 accesses a saved profile to retrieve data using a service such as a social media service.

As depicted in FIG. 3, program 200 saving behavioral information 312 from the first venue 310 and program 200 enables the user to transpose the behavioral information of the user from the first venue 310 to the second venue 320 to drive a recommendation based on the behavioral information from the first venue 310 to generate behavioral data 314 and 316 to a user. Blue shorts are an example of behavioral data that was collected by program 200. In an example, a user tried on a pair of blue shorts, 312 an example of behavioral data that was collected by program 200, in the first venue 310. The user behavior is saved on computing device 110, not pictured, with the user. The user decides that the user does not like the blue shorts, 312 an example of behavioral data that was collected by program 200, that the user tried on and leaves the store to go to second venue 320. In this example, the user finds one or more shirts, 314 an example of behavioral data that was collected by program 200, that the user wants to try on in the second venue 320 and brings them with her to the dressing room. Once inside the dressing room, program 200 requests approval to retrieve behaviors from the first venue 310, that a user has previously visited that same day or on another previous occasion, Program 200 determines that the user has given access to retrieve the previous behavioral data. Program 200 determines that the user had looked at a pair of blue shorts, 312 an example of behavioral data that was collected by program 200, in the previous first venue 310. Program 200 is able to make a recommendation for similar shorts, 316 an example of behavioral data, to go with the shirts that she brought into the dressing room that are being sold at the second venue 320. The user tries on the version of the shorts from the first venue, 310, at the second venue, 320. The user is able to find a pair of shorts that the user likes based on the recommendation from program 200 that included the behavioral data of the user from the first venue 310. In this example, program 200 determining new behaviors of the user, and identifying new behavioral data of the user, cause the recommendation engine, not depicted, to be continually updated. New recommendations for the second venue, 320, are presented to the user for cross sell opportunities based upon updating the behavioral data of a user from a first venue, second venue, third venue etc.

In step 280, program 200 provides the user with a product description based upon the generated recommendations. In an embodiment, program 200 generates a pairing between one or more databases to retrieve informational details of a product of interest to the user. In an example based upon FIG. 3, program 200, having determined that a user has entered a second store and been granted access to behavioral and profile data, is able to present a picture of 314 and 316, an example of behavioral data, to a user via GUI 130 to the display of the computing device. In this example, program 200 generated recommendations, 314 and 316, an example of behavioral data, to the user in second venue 320 based upon item 312 from the first venue 310. Program 200 generates and provides a product identification number for one or more products in second venue 320. In this embodiment, program 200 periodically utilizes the real time user behaviors, behavioral data, to retrain program 200 and generate novel cross co-occurrence models and matrices to drive the recommendations to a user utilizing software.

In another embodiment, program 200 generates a product identification number, presents a link of the product to the user via the display on the computing device of the user, and provides further product details of a plurality of related products based upon the generated recommendation. In an example, program 200 presents information of other products that are similar to 314 and 316, an example of behavioral data, to a user who has entered a third, not pictured, venue. Program 200 generates recommendations for a user in the third venue, not pictured, based upon the shared behavioral data that was captured and shared from the first venue 310, and the second venue 320.

Figure 4:
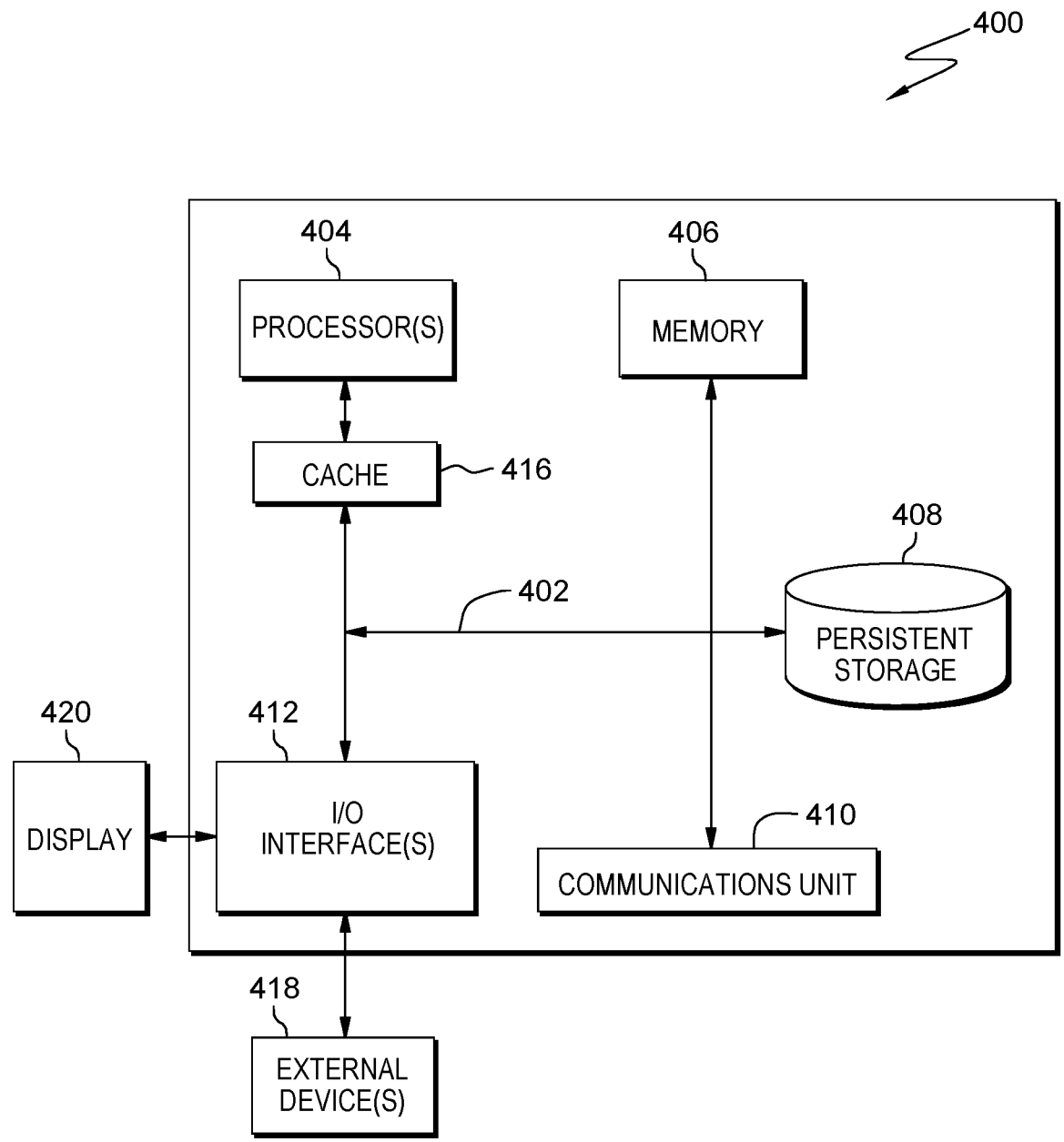
FIG. 4 is a block diagram of components of a computer system, such as the server computer of FIG. 1, in accordance with an embodiment of the present invention.

FIG. 4 depicts a block diagram of components of server 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server 120 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Program 200 may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program 200 may be downloaded to persistent storage 408 through communications unit 410.

I/O interface(s) 412 allows for input and output of data with other devices that may be connected to server 120. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., program 200, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for capturing and transposing user behavioral data, the method comprising:
   determining, by one or more processors, that a user enters a first venue, based on tracking a computing device of the user, wherein the tracking is comprised of a geographic information system (GIS) in communication with the computing device;
   accessing, by the one or more processors, a user profile associated with the user via the computing device;
   capturing, by the one or more processors, behavioral data of the user, wherein capturing the behavioral data is comprised of tracking the user's location within the first venue, based on one or more beacons and manipulation of merchandise by the user captured by sensors located within the merchandise and video data within the first venue, wherein manipulation of merchandise is comprised of touching a first product in the first venue as the user interacts with the first product;
   responsive to determining, based on tracking the computing device, that the user enters a second venue;
   analyzing, by the one or more processors, a history of requests and responses by the user to share the user profile to determine whether to grant access to the behavioral data;
   responsive to determining to grant access to the behavioral data, accessing, by the one or more processors, the behavioral data;
   utilizing, by the one or more processors, the behavioral data based on a cross co-occurrence model; and
   generating, by the one or more processors, a product recommendation to the user, based on the cross co-occurrence model utilizing the behavioral data.

2. The method of claim 1, further comprising:
   responsive to determining that the user enters the second venue, providing, by the one or more processors, a product description to the user, wherein the product description is an identification number for the product that is capable of linking to other product details and a picture of the product.

3. The method of claim 1, further comprising:
   responsive to determining that the user enters the second venue, requesting, by the one or more processors, retrieval of a recommended product by a store associate of the second venue for the user.

4. The method of claim 1, further comprising:
   responsive to determining that the user enters the second venue, and responsive to determining that the user profile is devoid of the behavioral data of the user, tracking, by the one or more processors, user data wherein the user data relates to product details of one or more products accessed by the user.

5. The method of claim 1, wherein capturing the behavioral data of the user in the first venue as the user interacts with the first product are actions selected from a group consisting of:
   looking at the first product, trying on the first product, returning the first product, exchanging the first product for a different size, exchanging the first product for a different color, placing the first product in a shopping cart, removing the first product from the shopping cart, interacting with a second product, and purchasing the first product.

6. The method of claim 1, further comprising:
   storing, by the one or more processors, the behavioral data of the user from a plurality of venues to one or more computing devices of the user, such that the user retains possession of the behavioral data of the user and is permitted to share data between the plurality of venues, including the first venue and the second venue, according to user preference.

7. A computer program product for capturing and transposing user behavioral data, the computer program product comprising:
   one or more computer readable tangible storage media and program instructions stored on at least one of the one or more computer readable tangible storage media, the program instructions readable/executable by the one or more computer processors and further comprising:

program instructions to determine that a user enters a first venue, based on tracking a computing device of the user, wherein the tracking is comprised of a geographic information system (GIS) in communication with the computing device;

program instructions to access a user profile associated with the user via the computing device;

program instructions to capture behavioral data of the user, wherein capturing the behavioral data is comprised of tracking the user's location within the first venue based on one or more beacons and manipulation of merchandise by the user captured by sensors located within the merchandise and video data within the first venue, wherein manipulation of merchandise is comprised of touching a first product;

responsive to determining that the user enters a second venue, based on tracking the computing device, program instructions to analyze a history of requests and responses by the user to share the user profile to determine whether to grant access to the behavioral data;

responsive to the determination to grant access to the behavioral data, program instructions to access, by the one or more processors, the behavioral data;

program instructions to utilize the behavioral data, based on a cross co-occurrence model; and program instructions to generate a recommendation to the user, based on the cross co-occurrence model utilizing the behavioral data.

8. The computer program product of claim 7 further comprising, responsive to determining that the user enters the second venue, program instructions, stored on the one or more computer readable tangible storage media, which when executed by a processor, cause the processor to:

provide a product description to the user, wherein the product description is an identification number for the product that is capable of linking to other product details, and a picture of the product.

9. The computer program product of claim 7 further comprising, responsive to determining that the user enters the second venue, program instructions, stored on the one or more computer readable tangible storage media, which when executed by a processor, cause the processor to:

request retrieval of a recommended product by a store associate of the second venue for the user.

10. The computer program product of claim 7 further comprising, responsive to determining that the user enters the second venue, program instructions, stored on the one or more computer readable tangible storage media, which when executed by a processor, cause the processor to:

responsive to determining that the user profile is devoid of user behavioral data, track user data wherein the user data relates to product details of one or more products accessed by the user.

11. The computer program product of claim 7, wherein capturing the behavioral data of the user in the first venue as the user interacts with the first product are actions selected from a group consisting of:

looking at the first product, trying on the first product, returning the first product, exchanging the first product for a different size, exchanging the first product for a different color, placing the first product in a shopping cart, removing the first product from the shopping cart, interacting with a second product, and purchasing the first product.

12. The computer program product of claim 7 further comprising program instructions, stored on the one or more computer readable tangible storage media, which when executed by a processor, cause the processor to:

store the behavioral data of the user from a plurality of venues to one or more computing devices of the user, such that the user retains possession of the behavioral data of the user and is permitted to share data between a plurality of venues, including the first venue and the second venue, according to user preference.

13. A computer system comprising:

one or more computer processors;

one or more computer readable storage media; and program instructions stored on the computer readable storage media for execution by at least one of the one or more computer processors, the program instructions comprising:

program instructions to determine that a user enters a first venue, based on tracking a computing device of the user, wherein the tracking is comprised of a geographic information system (GIS) in communication with the computing device;

program instructions to access a user profile associated with the user via the computing device;

program instructions to capture behavioral data of the user, wherein capturing the behavioral data is comprised of tracking the user's location within the first venue based on one or more beacons and manipulation of merchandise by the user captured by sensors located within the merchandise and video data within the first venue, wherein manipulation of merchandise is comprised of touching a first product;

program instructions to, responsive to determining, based on tracking the computing device, that the user enters a second venue;

program instructions to analyze a history of requests and responses by the user to share the user profile to determine whether to grant access to the behavioral data;

program instructions to, responsive to determining to grant access to the behavioral data, accessing, by the one or more processors, the behavioral data;

program instructions to utilize the behavioral data, based on a cross co-occurrence model; and program instructions to generate a recommendation to the user, based on the cross co-occurrence model utilizing the behavioral data.

14. The computer system of claim 13 further comprising, responsive to determining that the user enters the second venue, program instructions, stored on the one or more computer readable storage media, which when executed by a processor, cause the processor to:

provide a product description to the user, wherein the product description is an identification number for the product that is capable of linking to other product details, and a picture of the product.

15. The computer system of claim 13 further comprising, responsive to determining that the user enters the second venue, program instructions, stored on the one or more computer readable storage media, which when executed by a processor, cause the processor to:

request retrieval of a recommended product by a store associate of the second venue for the user.

16. The computer system of claim 13 further comprising, responsive to determining that the user enters the second venue, program instructions, stored on the one or more computer readable storage media, which when executed by a processor, cause the processor to:
- responsive to determining that the user profile is devoid of user behavioral data, track user data wherein the user data relates to product details of one or more products accessed by the user.

17. The computer system of claim 13 wherein capturing the behavioral data of the user in the first venue as the user interacts with the first product are actions selected from a group consisting of:
- looking at the first product, trying on the first product, returning the first product, exchanging the first product for a different size, exchanging the first product for a different color, placing the first product in a shopping cart, removing the first product from the shopping cart, interacting with a second product, and purchasing the first product.

* * * * *